United States Patent
Cabodi et al.

(12) United States Patent (10) Patent No.: US 11,932,568 B2
(45) Date of Patent: Mar. 19, 2024

(54) INSULATED TUCKSTONE

(71) Applicant: SAINT-GOBAIN CENTRE DE RECHERCHES ET D'ETUDES EUROPEEN, Courbevoie (FR)

(72) Inventors: Isabelle Cabodi, Cavaillon (FR); Pierrick Vespa, Aix-en-Provence (FR); Franceline Marguerite Louise Villermaux, Avignon (FR); Christian His, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 429 days.

(21) Appl. No.: 17/046,491

(22) PCT Filed: Apr. 10, 2019

(86) PCT No.: PCT/EP2019/059122
§ 371 (c)(1),
(2) Date: Oct. 9, 2020

(87) PCT Pub. No.: WO2019/197484
PCT Pub. Date: Oct. 17, 2019

(65) Prior Publication Data
US 2021/0130215 A1    May 6, 2021

(30) Foreign Application Priority Data

Apr. 10, 2018 (FR) ...................... 1853127

(51) Int. Cl.
*C03B 5/43* (2006.01)
(52) U.S. Cl.
CPC ..................... *C03B 5/43* (2013.01)

(58) Field of Classification Search
None
See application file for complete search history.

(56) References Cited

U.S. PATENT DOCUMENTS

| | | | | |
|---|---|---|---|---|
| 2,263,848 A | * | 11/1941 | Keaney | C03B 5/42 432/252 |
| 2,377,080 A | * | 5/1945 | Halbach | C03B 5/42 432/248 |

(Continued)

FOREIGN PATENT DOCUMENTS

| | | |
|---|---|---|
| CN | 202912820 U | 5/2013 |
| JP | S53-043713 A | 4/1978 |

(Continued)

OTHER PUBLICATIONS

Zirchrom 50 AZS as viewed at https://www.sefpro.com/solutions/products/sintered/zirchrom-50 (Year: 2022).*

(Continued)

*Primary Examiner* — Jodi C Franklin
(74) *Attorney, Agent, or Firm* — Ronald M. Kachmarik; Cooper Legal Group LLC (57) ABSTRACT

An insulated tuckstone that includes a basic tuckstone and an insulating layer exhibiting a thermal conductivity lower than 2.0 W·m 1·K−1 between 20° C. and 500° C., exhibiting enough rigidity to be self-supporting and covering an insulated surface of the basic tuckstone. The insulated surface is included in the lower surface of the basic tuckstone, extending into the lower transition surface and representing more than 20% of the lower transition surface. The insulating layer has a chemical composition, as a percentage by mass on the basis of the oxides, such that $Al_2O_3+SiO_2+ZrO_2+CaO+Na_2O+MgO+K_2O+TiO_2+Fe_2O_3+HfO_2+P_2O_5+Y_2O_3>80\%$.

17 Claims, 6 Drawing Sheets

(56) References Cited

U.S. PATENT DOCUMENTS

| | | | | |
|---|---|---|---|---|
| 3,684,262 | A * | 8/1972 | Busby | C03B 5/425 432/248 |
| 3,708,562 | A * | 1/1973 | Sleggs | C21B 7/06 266/286 |
| 4,823,359 | A * | 4/1989 | Ault | C03B 5/43 373/164 |
| 5,254,001 | A * | 10/1993 | Frolich | F27B 3/14 432/252 |
| 5,727,939 | A * | 3/1998 | Snyder | F27D 99/0073 432/205 |
| 6,372,288 | B1 * | 4/2002 | Meynckens | C04B 35/6303 427/427 |
| 2001/0019992 | A1 * | 9/2001 | Gaubil | C04B 35/109 501/105 |
| 2003/0037571 | A1 * | 2/2003 | Kobayashi | C03B 5/2353 65/134.4 |
| 2011/0124483 | A1 * | 5/2011 | Shah | C04B 35/584 252/502 |
| 2012/0157358 | A1 * | 6/2012 | Fang | E21B 43/267 507/269 |
| 2012/0189833 | A1 * | 7/2012 | Suchanek | C04B 35/80 501/153 |
| 2014/0007622 | A1 * | 1/2014 | Shock | C03B 5/20 65/335 |
| 2014/0024520 | A1 * | 1/2014 | Xiong | C04B 35/101 501/128 |
| 2014/0050765 | A1 * | 2/2014 | Liu | A61P 19/08 424/602 |
| 2014/0090421 | A1 * | 4/2014 | Shock | C03B 5/193 65/135.1 |
| 2014/0196504 | A1 * | 7/2014 | Cabodi | C03B 5/43 65/374.13 |
| 2016/0222281 | A1 * | 8/2016 | Chatterjee | C04B 35/645 |
| 2019/0048499 | A1 * | 2/2019 | Dovetta | D01G 9/00 |
| 2019/0128534 | A1 * | 5/2019 | Roux | F24C 7/067 |
| 2020/0339462 | A1 * | 10/2020 | Cabodi | C03B 5/43 |
| 2021/0130215 | A1 * | 5/2021 | Cabodi | C03B 5/43 |

FOREIGN PATENT DOCUMENTS

| | | | |
|---|---|---|---|
| JP | S5343713 A | | 4/1978 |
| JP | 2017-065985 A | | 4/2017 |
| JP | 2017065985 A | | 4/2017 |
| SU | 1016260 | * | 5/1983 ............ C03B 5/04 |

OTHER PUBLICATIONS

GROL as viewed at https://cdn.thomasnet.com/ccp/00456138/221183.pdf (Year: 14).*
Sardeshpande Model Based energy bench marking (Year: 2007).*
Walsh et. al. Department of energy Glass Furnace combustion and Melting research Facility (Year: 2004).*
Horn Glass Industries (Year: 2022).*
The 60th Anniversary of Shinagawa Technical Report Technical Report No. 58 (2015) (Year: 2015).*
Hubert IMI-NFG course on processing glass (Year: 2015).*
Translation of applicant submitted art JP 2017065985 (Year: 2017).*
Saric et al. Plant melter department of energy (Year: 1997).*
Wicks Compatibility Tests of Materials for a Prototype Ceramic Melter for Defense Glass-Waste Products (Year: 1979).*
Wei fused cast AZS tuckstone refractory (Year: 1978).*
International Search Report corresponding to International Application No. PCT/EP2019/059122 dated Jun. 26, 2019, 5 pages.
Office Action from Corresponding Japanese Application No. 2020-555456, 9 pages.
Japanese Office Action from Corresponding Japanese Application No. 2020-555456, 8 pages.
Indian Office Action from Corresponding Indian Application No. 202037043943, 7 pages.
Brazilian Office Action from Corresponding Brazilian Application No. BR20201120879, dated Mar. 15, 2023.
Wolfgang Trier, "Construction elements and dimensions", In: Glass furnaces, p. 22, 23, 56 57, Jan. 1, 1987, XP055527023, figures 3.22 and 3.99.
Indian Office Action from Corresponding Indian Application No. 202037043943, dated Oct. 25, 2022.

* cited by examiner

INSULATED TUCKSTONE

TECHNICAL FIELD

The invention relates to an insulated tuckstone for glass furnaces and to a glass furnace comprising such an insulated tuckstone.

PRIOR ART

Numerous glass products are manufactured by melting and refining a vitrifable mixture of raw materials containing compounds such as oxides, carbonates, sulfates and nitrates. These two steps are performed in furnaces the key constituent elements of which are refractory products able to withstand the thermal and mechanical stresses encountered in these furnaces, and in particular high temperatures. The glass furnaces thus generally comprise a great many refractory products, arranged in various locations according to their properties. For each part of the furnace, the product selected is the one that does not cause defects that render the glass unusable (as this would reduce production rates) and that has sufficient endurance for the furnace to have a satisfactory lifespan.

Figure 1:
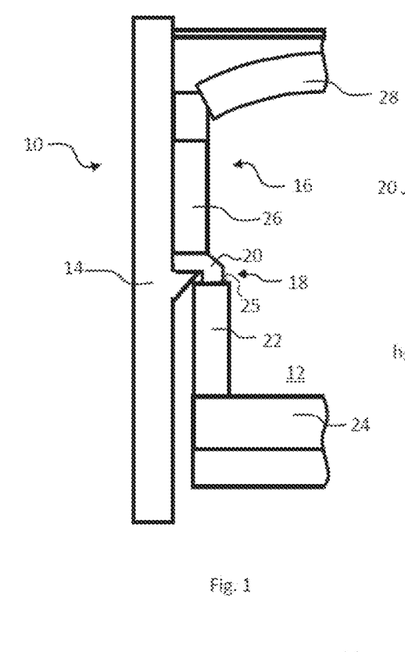
FIG. 1 schematically depicts a half section of a glass furnace.

FIG. 1 schematically depicts half a cross section of a glass furnace 10. Particularly discernible are a tank 12, a metallic structure 14 and a superstructure 16.

The tank 12, intended to contain the molten glass, comprises a vertical lateral wall 22 and a bottom 24. The lateral wall 22 is conventionally made up of lateral tank blocks which extend over the entire height of the tank, as far as an upper edge 25.

The superstructure 16 conventionally comprises, at its base, an intermediate course 18 via which it rests on the metallic structure, a lateral wall 26 resting on the intermediate course 18, and a crown 28. Burners, not depicted, are arranged in the lateral wall 26 and operate in alternation.

The metallic structure 14, conventionally made of cast iron, externally surrounds the lateral wall 22 of the tank. It supports the weight of the superstructure 16.

Figure 2A:
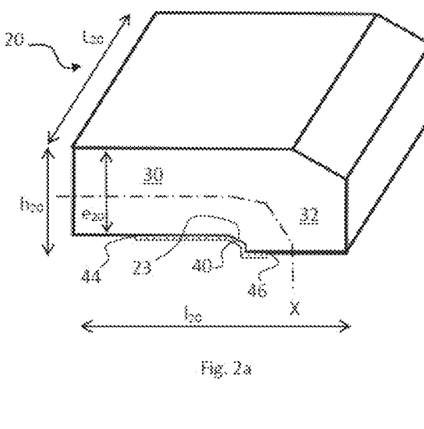

The intermediate course 18 comprises, and is preferably made up of, basic tuckstones 20 which, conventionally, have the shape depicted in FIG. 2a. Conventionally, each basic tuckstone 20 has the overall shape of a profile section of L-shaped cross section. In service, the long leg of the L, or "superstructure leg" 30, extends horizontally. The short leg of the L, or "tank leg" 32, extends vertically, under the superstructure leg 30.

The exterior surface of a basic tuckstone 20 is made up:
of first and second end surfaces, $20_1$ and $20_2$ respectively, delimiting the length $L_{20}$ of the basic tuckstone, namely of the profile section,
of a lower surface $20_3$ comprising a horizontal laying surface $20_{14}$ resting, in service, on the metallic structure 14, a tank surface $20_{12}$, which is preferably horizontal, extending in service facing the upper edge 25 of the tank 12, and a lower transition surface $20_{14-12}$ connecting the laying surface $20_{14}$ and the tank surface $20_{12}$,
of an exterior lateral surface $20_4$, which is preferably vertical,
of an upper surface $20_4$ comprising a superstructure surface $20_{26}$, which is preferably horizontal, on which, in service, the lateral wall 26 rests, and an upper transition surface $20_{26-3}$ connecting the superstructure surface $20_{26}$ and the lower surface $20_3$, and in particular the tank surface $20_{12}$.

Figure 2B:
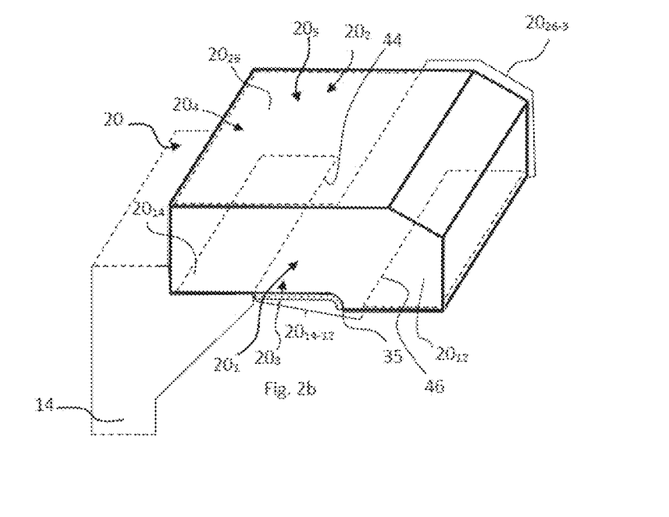

In FIG. 2b, the tank surface $20_{12}$, laying surface $20_{14}$ and superstructure surface $20_{26}$ are delineated in broken line.

The basic tuckstone 20 needs to withstand significant thermal stresses because the superstructure leg 30 is partially in an environment at a temperature of the order of a hundred or so degrees, generally because of the presence of blown-air cooling, whereas the tank leg 32, which is partially inside the furnace, is at temperatures of around 1500° C.

Furthermore, the basic tuckstone experiences thermal cycles due to the alternating operation of the burners and to maintenance operations, such as operations referred to as "tank patching" which entails stopping and then resuming the external cooling of the furnace, or else operations of changing the burners or burner units, which entail stopping and then restarting the burners.

In order to withstand these stresses, the basic tuckstone is made up of a refractory product, notably of a product of the alumina-zirconia-silica type (AZS for short) generally containing from 30 to 45% by mass of zirconia, of a product with a very high zirconia content (typically more than 85% by mass of zirconia), of a product with a high alumina content (typically more than 90% by mass of alumina) or of a zircon product.

However, the ability of the basic tuckstones to resist cracking is sometimes insufficient to meet the current changing needs of glass manufacturers, who are demanding a lengthening of the lifespan of the furnaces. Specifically, the cracking of a basic tuckstone may lead to a fracture that causes debris to fall into the bath of molten glass thus generating defects in the glass. Furthermore, the basic tuckstone then no longer correctly protects the metallic structure and the tank. The rest of the superstructure may also find itself unbalanced.

There is therefore a need to improve the resistance of basic tuckstones to cracking. It is an object of the invention to address this need.

SUMMARY OF THE INVENTION

The invention relates to an insulated tuckstone containing:
a basic tuckstone defining an exterior surface as described hereinabove;
an insulating layer exhibiting a thermal conductivity lower than 2.0 W·m$^{-1}$·K$^{-1}$ between 20° C. and 500° C., and covering an insulated surface of the basic tuckstone, said insulated surface being included in the lower surface $20_3$ of said basic tuckstone, extending into the lower transition surface $20_{14-12}$, and representing more than 20% of the lower transition surface $20_{14-12}$,
said insulating layer having a chemical composition, as a percentage by mass on the basis of the oxides, such that the sum of the $Al_2O_3$, $SiO_2$, $ZrO_2$, CaO, $Na_2O$, MgO, $K_2O$, $TiO_2$, $Fe_2O_3$, $HfO_2$, $P_2O_5$ and $Y_2O_3$ contents, or "$Al_2O_3+SiO_2+ZrO_2+CaO+Na_2O+MgO+K_2O+TiO_2+Fe_2O_3+HfO_2+P_2O_5+Y_2O_3$", >80%.

Surprisingly, the inventors have found that the presence of such an insulating layer considerably improves the resistance to cracking of the basic tuckstone, and therefore its life.

In the remainder of the description, such a tuckstone, comprising a basic tuckstone and an insulating layer, is referred to as "insulated tuckstone" or "tuckstone according to the invention".

As a preference, the insulating layer has enough rigidity to be self-supporting.

As a preference, the insulating layer has a compressive crush strength greater than 10 MPa, which improves the stability of the tuckstone and the insulation thereof.

In one particularly advantageous embodiment, the insulating layer is a ceramic matrix composite, or "CMC". A CMC has proven to be particularly resistant to thermal degradation. A CMC also exhibits good resistance to corrosion from soda-containing vapors. It typically has enough rigidity to form a self-supporting insulating layer, and a compression strength greater than 1 MPa and a compressive crush strength greater than 10 MPa.

The invention also relates to a method for manufacturing a furnace comprising a glass melting tank, a superstructure extending over the tank, and a metallic structure supporting a lateral wall of the superstructure, said method involving incorporating an insulated tuckstone according to the invention into an intermediate course between the metallic structure and said superstructure lateral wall,
- a lateral wall of the superstructure resting, directly or otherwise, preferably directly, on the superstructure surface of the basic tuckstone,
- a laying surface of the basic tuckstone resting, directly or otherwise, preferably directly, on the metallic structure, and
- a tank surface of the basic tuckstone facing an upper edge of the tank.

The invention relates finally to a glass furnace comprising:
- a tank comprising an upper edge;
- a metallic structure; and
- a superstructure comprising an intermediate course comprising an insulated tuckstone according to the invention,
- a lateral wall of the superstructure resting, directly or otherwise, preferably directly, on the superstructure surface of the basic tuckstone,
- a laying surface of the basic tuckstone resting, directly or otherwise, preferably directly, on the metallic structure, and a tank surface of the basic tuckstone facing an upper edge of the tank.

As a preference, the intermediate course is made up of insulated tuckstones according to the invention.

The insulated tuckstone according to the invention may further comprise one or more of the following optional features:
- the insulated surface extends at least as far as the laying surface;
- the insulated surface represents more than 60% of the lower transition surface;
- the lower transition surface includes a lower junction surface connecting said superstructure leg and tank leg, and the insulated surface extends in such a way as to cover at least said lower junction surface;
- the lower junction surface connects a horizontal surface of the superstructure leg including the laying surface and a horizontal surface of the tank leg including the tank surface;
- the insulated surface extends at least to part of a horizontal portion of the lower transition surface defined by the superstructure leg;
- the insulated surface extends at least to part of the laying surface;
- the insulated surface extends over the entire laying surface;
- the insulated surface extends as far as a horizontal portion of the lower transition surface defined by the tank leg, without covering said horizontal portion or the insulated surface extends at least to part of a horizontal portion of the lower transition surface defined by the tank leg;
- the insulated surface extends as far as the tank surface;
- the insulating layer is attached to the insulated surface;
- the insulating layer is selected from a felt, an insulating panel, a ceramic foam, a ceramic matrix composite, and mixtures thereof;
- the insulating layer has a chemical composition, as a percentage by mass on the basis of the oxides, such that $Al_2O_3+SiO_2+ZrO_2+CaO+Na_2O+MgO+K_2O+TiO_2+Fe_2O_3+HfO_2+P_2O_5+Y_2O_3>90\%$;
- more than 90% of the mass of the insulating layer is made up of oxides;
- the insulating layer is made of a sintered material;
- the insulating layer comprises, preferably is made up of, a ceramic matrix composite made up of fibers bound together by a ceramic matrix, the fibers preferably representing more than 30% and/or less than 70% of the volume of the ceramic matrix composite;
- the fibers are made of an oxide material comprising more than 50% $Al_2O_3$ and/or $SiO_2$ and/or $ZrO_2$, as a percentage by mass on the basis of the oxides;
- the fibers are selected from among
  fibers made up, by mass, of more than 95% alumina,
  fibers made up, by mass, of more than 95% silica,
  fibers made up, by mass, of more than 95% mullite, and
  fibers made up, by mass, of more than 95% glass;
- the matrix contains $Al_2O_3$ and/or $SiO_2$;
- the matrix has an $Al_2O_3$ content greater than 65% and/or an $SiO_2$ content greater than 15% and less than 35% and/or a content of oxides other than $Al_2O_3$ and $SiO_2$ of less than 3%, as percentages by mass on the basis of the matrix;
- the ceramic matrix composite exhibits the following chemical analysis, as percentages by mass on the basis of the oxides and for a total of 100%:
  $SiO_2$: 47%-67%,
  $Al_2O_3$: 32%-52%,
  oxide species other than $Al_2O_3$ and $SiO_2$: <5%;
- the insulating layer exhibits a thermal conductivity lower than 0.6 $W \cdot m^{-1} \cdot K^{-1}$ between 20° C. and 500° C.;
- the insulating layer exhibits a sandwich structure comprising, in superposition, a first sheet of a ceramic matrix composite, a filling material exhibiting a thermal conductivity lower than 2.0 $W \cdot m^{-1} \cdot K^{-1}$ between 20° C. and 500° C., and a second sheet of a ceramic matrix composite.

Definitions

For the sake of clarity, a distinction is made between the "basic" tuckstone and the "insulated" tuckstone, the insulated tuckstone being made up of the basic tuckstone and of the insulating layer that covers it, namely that is in contact with part of the lower exterior surface thereof.

A transverse plane is a plane perpendicular to the length direction. The transverse midplane is the transverse plane passing midway along the length.

"Lower" and "upper", "interior" and "exterior", "horizontal" and "vertical" refer to orientations or to positions when the insulated tuckstone is in its service position in a glass furnace, as in FIG. 1.

What is meant by "horizontal" and "vertical" is an orientation that makes with a plane that is perfectly horizontal and perfectly vertical, respectively, an angle less than 5°, or even less than 2°, or even less than 1°.

What is meant by "cast product", often referred to as being "electrocast" is a product obtained by complete solidification of a composition in the liquid state which is obtained by melting a mixture of suitable raw materials in an electric-arc furnace or using any other suitable technique.

What is meant by "sintered product" is a product obtained by mixing suitable raw materials then forming this mixture into shape in the raw form and baking the resulting raw component at a temperature and for a time that are sufficient to obtain sintering of this raw component, it being possible for said baking to be performed in situ during use.

What is meant by "ceramic matrix composite" or "CMC" is, in the conventional way, a product made up of fibers rigidly bound together by a ceramic matrix.

What is meant by "ceramic" is a product which is neither metallic nor organic. In the context of the present invention, carbon is not considered to be a ceramic product.

What is meant by "skin" is, in the conventional way, the peripheral region of a molten block, made up of the molten material which lay less than 5 millimeters (mm) from the wall of the mold as it solidified.

A surface exhibits a "skin microstructure" when it exhibits a crystals density greater than 4 times, or even greater than 6 times, or even greater than 7 times, or even greater than 9 times the crystals density measured at a depth of 4 centimeters (cm) beneath said surface.

The "crystals density" of a surface is determined by counting the crystals visible on a microscopy screenshot of this surface, after said surface has been polished with an abrasive cloth down to a grade of 1 micron. Each crystal is delimited by the vitreous phase. Only those crystals that exhibit a surface area greater than 12 square microns are counted. In order to verify whether a surface of a basic tuckstone exhibits a skin microstructure, the crystals visible on a screenshot of this surface after it has been polished are counted, then the basic tuckstone is cut at a depth of 4 cm beneath this surface and the crystals visible on a screenshot of the surface thus exposed are counted, after this surface has been polished.

What is meant by "machining" is a grinding operation in which the surface of a refractory component is machined in order to obtain a precise surface geometry. Conventionally, and in one particular embodiment of the invention, the machining leads to the removal at least of the skin.

If a component is said to "support" or "rest on" another component, these two components bear against one another. The two components may be in contact or may be separated by an intermediate element, notably by an insulating layer.

The tank surface is the surface which, in the service position, "faces" the upper edge of the tank, namely extends substantially parallel to this edge, above and in the immediate vicinity of this edge. The tank surface is thus defined by the collection of points of the exterior surface which are at the minimum distance from the edge of the tank. The tank surface, which is preferably horizontal, therefore does not extend, toward the outside of the tank, beyond the interior edge 35 which delimits the lower horizontal surface of the tank leg (FIG. 2b). The interior edge 35 may in particular define a right-angled corner.

For the sake of clarity, the chemical formulae of the oxides are used to denote the contents of these oxides in a composition. For example, "$ZrO_2$", "$SiO_2$" or "$Al_2O_3$" denote the contents of these oxides, and "zirconia", "silica" and "alumina" are used to denote phases of these oxides made up of $ZrO_2$, $SiO_2$ and $Al_2O_3$, respectively.

Unless mentioned otherwise, all the oxide contents are percentages by mass on the basis of the oxides. A mass content of an oxide of a metallic element relates to the total content of this element expressed in the form of the most stable oxide, according to the usual conventions used in industry.

$HfO_2$ is not chemically dissociable from $ZrO_2$. However, according to the present invention, $HfO_2$ is not added deliberately. $HfO_2$ therefore refers only to the traces of hafnium oxide, this oxide always being naturally present in sources of zirconia at mass contents generally below 5%, generally below 2%. In a basic tuckstone, the mass content of $HfO_2$ is preferably less than 5%, preferably less than 3%, preferably less than 2%. For the sake of clarity, the total content of zirconium oxide and traces of hafnium oxide may be denoted indifferently as "$ZrO_2$" or as "$ZrO_2+HfO_2$".

The sum of the oxide contents does not imply that all of these oxides are present.

"Comprise" or "contain" or "exhibit" are to be interpreted nonlimitingly.

BRIEF DESCRIPTION OF THE FIGURES

Further features and advantages of the invention will become more apparent from reading the detailed description which will follow and from studying the attached drawing in which:

FIG. 2 (2a, 2b, 2c) is a schematic view, in perspective, of examples of insulated tuckstones according to the invention, the shape of the basic tuckstone depicted being the conventional shape of conventional tuckstones;

FIG. 5 (5a, 5b, 5c, 5d) illustrates the device employed for testing the examples;

FIG. 6 (6a, 6b) depicts, after the second test of the examples, a tuckstone according to the invention and a tuckstone not according to the invention, the cracks having been identified with a marker.

DETAILED DESCRIPTION

An insulated tuckstone according to the invention comprises a basic tuckstone 20 and an insulating layer 40.

Basic Tuckstone

As FIG. 1 has already been described in the preamble, reference is now made to FIG. 2a, partially described in the preamble.

The shape of the basic tuckstone 20 may be a shape that is known for conventional tuckstones.

The length $L_{20}$ of the basic tuckstone 20 is preferably greater than 10 cm and preferably less than 100 cm. Its width $l_{20}$ is preferably greater than 30 cm and/or less than 100 cm and its height $h_{20}$ is preferably greater than 10 cm and/or less than 50 cm.

In a transverse plane of section, namely one perpendicular to the direction of the length $L_{20}$, the line that extends midway between the upper surface $20_S$ and lower surface $20_3$ is referred to as the "axis X". The thickness $e_{20}$ of the basic tuckstone is, at a point on the axis X contained in the transverse midplane, the shortest dimension measured perpendicular to the axis X at that point. As a preference, the mean thickness of the basic tuckstone along the axis X is greater than 10 cm and/or less than 50 cm. As a preference, this thickness is constant along the axis X.

As a preference, in any transverse section, the thickness of the basic tuckstone is constant.

The basic tuckstone is preferably a profile section, which means that its dimensions in a transverse plane are independent of the transverse plane of section considered.

Figure 2C:
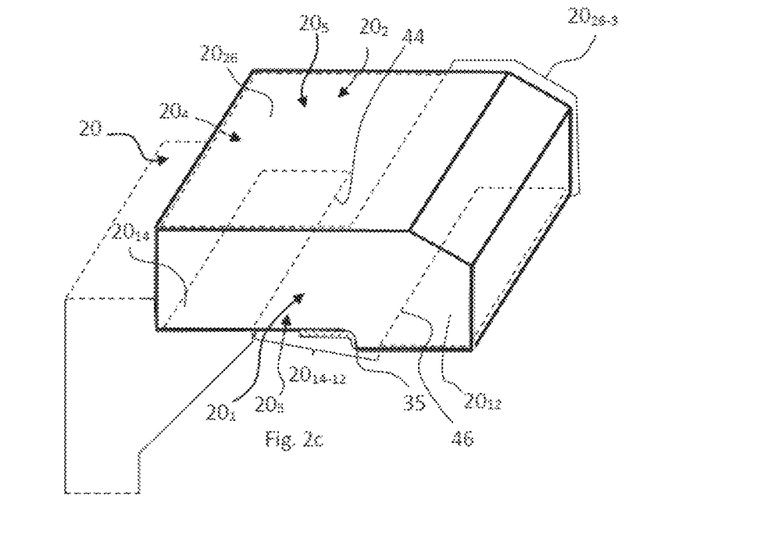

As in the embodiment of FIG. 2, the upper surface and/or the lower surface may consist of flat facets.

In one preferred embodiment (FIG. 3), the upper surface and/or the lower surface comprise at least one curved surface.

Figure 3:
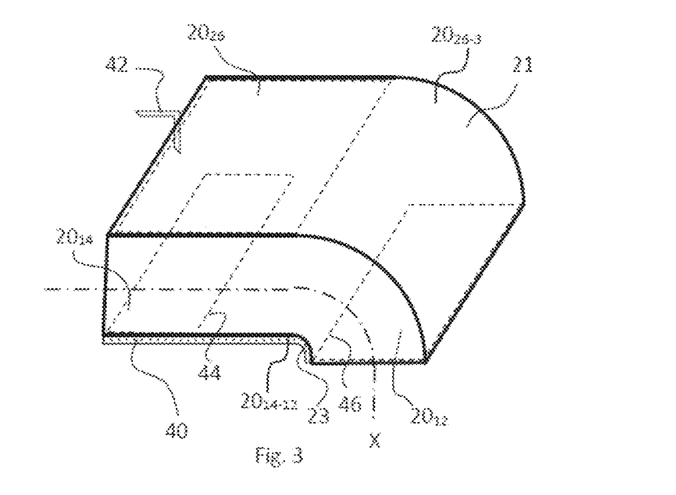
FIG. 3 is a schematic view, in perspective, of one example of an insulated tuckstone in one preferred embodiment of the invention.

As a preference, the upper transition surface $20_{26\text{-}3}$ of the basic tuckstone defines, in the part containing the junction between the superstructure leg and tank leg, an upper junction surface 21 that is curved, i.e. nonplanar, without any sharp edges and which, as a preference, comprises or even constitutes a fraction of a circular-base cylinder. As a preference, as depicted, this cylindrical fraction extends angularly over 90° (one quarter of a segment of a cylinder).

As a preference, this upper junction surface connects a horizontal surface of the superstructure leg, particularly the horizontal surface which contains the superstructure surface, and a horizontal surface of the tank leg, particularly the tank surface.

As a preference, the lower transition surface $20_{14\text{-}12}$ of the basic tuckstone defines, in the part containing the junction between the superstructure leg and the tank leg, a curved lower junction surface 23 with no sharp edges and which, as a preference, comprises or even constitutes a fraction of a circular-base cylinder. As a preference, as depicted, this cylindrical fraction extends angularly over 90°.

As a preference, this lower junction surface connects a horizontal surface of the superstructure leg, particularly the horizontal surface which contains the laying surface, and a horizontal surface of the tank leg, particularly the horizontal surface which contains the tank surface.

In one embodiment, this cylindrical fraction is substantially coaxial with the cylindrical fraction of the upper transition surface.

When the basic tuckstone is obtained by casting in a mold, the mold is preferably produced by 3D printing, as this makes it possible to more easily create surfaces that do not have sharp edges, and in particular the upper transition surface and/or the lower transition surface, and notably cylindrical fractions of these transition surfaces. The mechanical strength of the basic tuckstone is thereby improved.

The end surfaces $20_1$ and $20_2$ of the basic tuckstone are preferably planar, and in particular devoid of discontinuities, preferably substantially parallel to one another, and preferably substantially vertical.

Furthermore, in one embodiment, the first and second end surfaces of the basic tuckstone respectively define a tenon and a mortise of a shape that complements said tenon, so that, in the service position, said tenon is housed in a mortise of a first adjacent basic tuckstone and so that said mortise houses a tenon of a second adjacent tuckstone (male/female interlocking).

The chemical composition of the basic tuckstone may be a composition known for conventional tuckstones.

More than 95%, preferably more than 97%, preferably more than 99%, preferably more than 99.5%, preferably more than 99.9% of the mass of the basic tuckstone consists of oxides.

As a preference, the basic tuckstone exhibits a chemical composition, as a percentage by mass on the basis of the oxides, such that $Al_2O_3+ZrO_2+SiO_2>80.0\%$.

In one embodiment, the basic tuckstone, which is preferably cast, exhibits a chemical composition comprising, as a percentage by mass on the basis of the oxides, more than 0.5%, or even more than 1.5%, or even more than 3.0%, or even more than 4.0%, or even more than 5.0%, or even more than 6.0%, and/or less than 10.0%, or even less than 9.0%, or even less than 8.0% of a zirconia stabilizer, particularly CaO and/or $Y_2O_3$ and/or MgO and/or $CeO_2$, preferably $Y_2O_3$ and/or CaO, preferably $Y_2O_3$.

In one embodiment, the basic tuckstone, which is preferably cast, exhibits a chemical composition, as a percentage by mass on the basis of the oxides, such that, for a total of 100%:

- $Al_2O_3+ZrO_2+SiO_2$: more than 80.0%, preferably more than 84.0%, preferably more than 86.0%, and/or less than 97.0%, or even less than 95.0%, or even less than 94.0%,
- $Y_2O_3$: less than 5.0%, or even less than 4.0%, or even less than 3.0%, and preferably more than 0.5%, or even more than 1.5%, or even more than 2.0%,
- $Na_2O$: more than 0.1%, or even more than 0.2%, and/or less than 1.5%, preferably less than 1%, preferably less than 0.6%, preferably less than 0.5%, or even less than 0.4%,
- $B_2O_3$: more than 0.1%, or even more than 0.2% and less than 0.6%, preferably less than 0.5%, or even less than 0.4%,
- oxide species other than $Al_2O_3$, $ZrO_2$, $SiO_2$, $Y_2O_3$, $Na_2O$ and $B_2O_3$: less than 13.0%, preferably less than 9.0%, preferably less than 8.0%, preferably less than less than 5.0%, or even less than 3.0%, or even less than 2.0%, or even less than 1.0%, or even less than 0.5%.

In one embodiment, the basic tuckstone, which is preferably cast, preferably exhibits a chemical composition, in percentage by mass on the basis of the oxides, such that, for a total of 100%:

- $ZrO_2$: more than 12.0%, preferably more than 20.0%, preferably more than 25.0%, preferably more than 30.0%, and/or less than 46.0%, preferably less than 42.0%, and
- $SiO_2$: more than 8.0%, preferably more than 10.0%, and/or less than 24.0%, preferably less than 20.0%, preferably less than 17.0%, and
- $Al_2O_3$: more than 35.0%, preferably more than 40.0%, and/or less than 60.0%, preferably less than 55.0%, preferably less than 50.0%, and
- oxide species other than $Al_2O_3$, $ZrO_2$ and $SiO_2$: less than 10.0%, preferably less than 8.0%, preferably less than 6.0%, or even less than 4.0%, or even less than 3.0%, or such that

- $ZrO_2$: more than 80.0%, preferably more than 85.0%, and/or less than 97.0%, preferably less than 96.0%; and
- $SiO_2$: more than 0.5%, preferably more than 1.0%, preferably more than 2.0%, preferably more than 3.0%, and/or less than 15.0%, preferably less than 12.0%, preferably less than 10.0%, and
- $Al_2O_3$: more than 0.2%, and/or less than 3.0%, preferably less than 2.0%, and
- oxide species other than $Al_2O_3$, $ZrO_2$ and $SiO_2$: less than 8.0%, preferably less than 6.0%, preferably less than 4.0%, or such that

- $Al_2O_3$: more than 90.0%, preferably more than 91.0%, and/or less than 98.0%, preferably less than 97.0%, and
- $SiO_2$: more than 0.2%, and/or less than 7.0%, preferably less than 6.0%, or even less than 4.0%, or even less than 3.0%, and oxide species other than $Al_2O_3$ and $SiO_2$: less than 8.0%, preferably less than 6.0%, preferably less than 5.0%, or such that $ZrO_2$: more than 62.0%, preferably more than 64.0%, and/or less than 71.0%, preferably less than 69.0%, and
$SiO_2$: more than 26.0%, preferably more than 28.0%, and/or less than 36.0%, preferably less than 34.0%, and
oxide species other than $ZrO_2$ and $SiO_2$: less than 6.0%, preferably less than 4.0%, preferably less than 3.0%, or such that
$SiO_2$: more than 90.0%, preferably more than 93.0%, and oxide species other than $SiO_2$: less than 10.0%, preferably less than 7.0%.

The microstructure of the tuckstone may be a microstructure that is known for conventional tuckstones.

As a preference, the tuckstone is a cast product and may further comprise one or more of the following optional features:
- at least part, preferably all, of the lower transition surface of the tuckstone exhibits a skin microstructure;
- at least part, preferably the entirety, of the surfaces of the tuckstone that are intended to be exposed to the environment inside the furnace exhibit a skin microstructure. In particular, preferably at least part, preferably all, of the tank surface and/or the upper transition surface exhibit(s) a skin microstructure;
- at least part, preferably all, of the laying surface $20_{14}$ of the basic tuckstone, preferably all of the lower surface $20_3$ and/or all or part of the upper transition surface $20_{26-3}$, preferably at least the non-horizontal part of the upper transition surface $20_{26-3}$ and/or all or part of the exterior lateral surface $20_4$ exhibit(s) a skin microstructure. The resistance to cracking and the machining time are thus improved;
- at least the superstructure surface and the end surfaces of the basic tuckstone do not exhibit a skin microstructure;
- the surface with a skin microstructure exhibits a crystals density less than 30 times, or even less than 25 times, or even less than 20 times the crystals density measured at a depth of 4 cm beneath said surface;
- the surface with a skin microstructure, and in particular at least part of the lower transition surface, exhibits a crystals density greater than 130 crystals per square millimeter ($mm^2$), preferably greater than 150 crystals per $mm^2$, preferably greater than 180 crystals per $mm^2$, preferably greater than 200 crystals per $mm^2$, greater than 230 crystals per $mm^2$, or even greater than 250 crystals per $mm^2$;
- the basic tuckstone has a $ZrO_2$ content, as a percentage by mass on the basis of the oxides, greater than 80.0%, and the surface with a skin microstructure, and in particular at least part of the lower transition surface, exhibits a crystals density greater than 600 crystals per $mm^2$, preferably greater than 650 crystals per $mm^2$, preferably greater than 700 crystals per $mm^2$, preferably greater than 800 crystals per $mm^2$, greater than 900 crystals per $mm^2$, greater than 1000 crystals per $mm^2$, or even greater than 1100 crystals per $mm^2$;
- the tuckstone has a $ZrO_2$ content, as a percentage by mass on the basis of the oxides, greater than 80.0%, and the mean equivalent diameter of said crystals of the surface with a skin microstructure, and in particular of at least part of the lower transition surface, is less than 45 μm, preferably less than 40 μm, and/or preferably greater than 20 μm or greater than 30 μm.

Obtaining a skin microstructure at the surface of a cast tuckstone, that is to say one made as a cast product, presents the person skilled in the art with no particular difficulty. In particular, the person skilled in the art knows that a microstructure can be rendered finer at the surface by increasing the rate at which the molten material solidifies.

When the bath of molten material is poured into the mold, the properties of the mold and the temperature of the mold may notably be adapted to ensure cooling that is rapid enough to obtain a skin microstructure. For example, when the mold is initially at ambient temperature, a skin microstructure forms at the surface in contact with or in proximity to the walls of the mold. If, unlike what is done as part of the routine practice, this skin is not eliminated during a machining operation, a skin microstructure is thus obtained on those surfaces of the basic tuckstone which have not been machined.

Limited machining (surfacing) does, however, allow a skin microstructure to be retained.

In one embodiment, the basic tuckstone is provided with an anchoring device 42 for anchoring in the metallic casing of the glass furnace. This anchoring device consists for example of a screw, of a hook, of a metal plate, or of a cutout. This anchoring device is preferably attached at less than 20 cm, preferably less than 10 cm, preferably less than 5 cm, from the superstructure surface, or even attached to the superstructure surface (FIG. 3).

The basic tuckstone may be a sintered product.

Of course, the dimensions, shapes and microstructures described hereinabove are nonlimiting.

Insulating Layer

As a preference, the insulating layer 40 exhibits a chemical composition, as percentage by mass on the basis of the oxides, such that $Al_2O_3+SiO_2+ZrO_2+CaO+Na_2O+MgO+K_2O+TiO_2+Fe_2O_3+HfO_2+P_2O_5+Y_2O_3$, >85%, preferably greater than 90%, or even greater than 95%.

As a preference, the insulating layer 40 exhibits a chemical composition, as a percentage by mass on the basis of the oxides, such that $Al_2O_3+SiO_2+ZrO_2+CaO+Na_2O+MgO+K_2O+TiO_2+Fe_2O_3+HfO_2+$, >80% preferably greater than 85%, preferably greater than 90%, or even greater than 95%.

As a preference, the insulating layer exhibits a chemical composition, as a percentage by mass on the basis of the oxides, such that $Al_2O_3+SiO_2+ZrO_2+CaO+HfO_{2>80}$%, preferably greater than 85%, preferably greater than 90%, or even greater than 95%.

In one embodiment, the insulating layer exhibits a chemical composition, as a percentage by mass on the basis of the oxides, such that $Al_2O_3+SiO_2$>80%, preferably greater than 85%, preferably greater than 90%, or even greater than 95%.

As a preference, more than 90% of the mass, preferably more than 95% of the mass, preferably more than 98% of the mass, preferably more than 99% of the mass, preferably more than 99.5% of the mass, of the insulating layer consists of oxides.

As a preference, the insulating layer 40 is selected from among:
- a felt, preferably a felt made of ceramic fibers, preferably exhibiting an $Al_2O_3+SiO_2$ content greater than 80%, or even greater than 85%, or even greater than 90% by mass,
- an insulating panel or a rigid fibrous insulating panel,
- a ceramic foam, preferably exhibiting an $Al_2O_3+SiO_2$ content greater than 80%, or even greater than 85%, or even greater than 90% by mass,
- a ceramic matrix composite (CMC), preferably with more than 90% of its mass, preferably more than 95% of its mass, preferably more than 98% of its mass, preferably more than 99% of its mass, preferably more than 99.5% of its mass, made up of oxides, and mixtures thereof.

The insulating layer 40 exhibits a thermal conductivity less than 2.0 $W·m^{-1}·K^{-1}$, preferably less than 1.8 $W·m^{-1}·K^{-1}$, preferably less than 1.5 $W·m^{-1}·K^{-1}$, preferably less than 1.3 $W·m^{-1}·K^{-1}$, preferably less than 1 $W·m^{-1}·K^{-1}$, preferably less than 0.9 $W·m^{-1}·K^{-1}$, preferably less than preferably less than 0.7 $W·m^{-1}·K^{-1}$, preferably less than 0.6 $W·m^{-1}·K^{-1}$, preferably less than 0.5 $W·m^{-1}·K^{-1}$ between 20° C. and 500° C., preferably between 20° C. and 600° C., preferably between 20° C. and 700° C., preferably between 20° C. and 800° C., preferably between 20° C. and 900° C., preferably between 20° C. and 1000° C.

As a preference, the insulating layer 40 covers more than 40%, more than 60%, more than 70%, more than 80%, more than 90%, or even 100% of the lower transition surface $20_{14-12}$.

The surface of the basic tuckstone which is included in the lower surface and covered by the insulating layer, namely in contact with that layer, is referred to as the "insulated surface".

The insulated surface extends over at least part of the lower transition surface $20_{14-12}$ which connects the laying surface $20_{14}$ and the tank surface $20_{12}$ of said basic tuckstone, preferably over the entire lower transition surface $20_{14-12}$.

As depicted in FIG. 2c, the insulating layer does not necessarily extend as far as the laying surface in the lower transition surface $20_{14-12}$. However, as a preference, it preferably extends to less than 30 mm, preferably to less than 20 mm, preferably to less than 10 mm from the laying surface. As a preference, the insulated surface extends as far as the laying surface, namely at least as far as the line 44 indicated in FIGS. 2a, 2b and 3.

In the embodiments depicted, the insulated surface thus extends over at least part of the horizontal portion of the lower transition surface $20_{14-12}$ defined by the superstructure leg, at least until it reaches the laying surface $20_{14}$.

In one embodiment, the insulated surface does not extend so far as to cover, even partially, the laying surface (FIGS. 2a and 2b).

In one embodiment, the insulated surface extends in part, or even entirely, to the laying surface, as depicted in FIG. 3. In the service position (FIG. 1), it is therefore pinched between the laying surface 2014 and the metallic structure 14. When the insulating layer is rigid, the pinching of the insulating layer between the laying surface and the metallic structure advantageously allows this insulating layer to be held against the insulated surface without the need to attach it to the basic tuckstone.

The insulated surface may in particular extend over more than 50%, 60%, 70%, 80%, 90% or even 100% of the laying surface.

As a preference, the insulated surface extends at least to the lower junction surface 23 which connects the superstructure leg and tank leg, as depicted in FIG. 2a.

As a preference, the insulated surface extends at least as far as the laying surface and at least as far as the junction surface. This embodiment is particularly effective at preventing cracks from appearing in service.

In one embodiment, the insulated surface does not extend, on the side of the tank leg, beyond the lower junction surface 23 on the side of the tank leg. Thus, in FIG. 2b, the insulated surface does not extend to the lower horizontal surface of the tank leg, namely beyond the lower edge 35, and this makes the insulated plate block easier to implement.

In one preferred embodiment, the insulated surface extends over the entirety of the laying surface and as far as the lower edge 35.

In another embodiment, the insulated surface extends, on the side of the tank leg, beyond the lower junction surface 23. In the embodiment depicted in FIG. 2a, it thus partially covers the lower horizontal surface of the tank leg.

As a preference, as depicted in FIG. 2a, it extends as far as the tank surface. However, as a preference, it does not extend, on the side of the tank leg, so far as to cover, even partially, the tank surface, namely beyond the line 46 indicated in FIGS. 2a, 2b and 3.

In one preferred embodiment (FIG. 2a), the insulated surface extends to all of the lower transition surface $20_{14-12}$ of the basic tuckstone.

In one preferred embodiment, the insulated surface extends over the entirety of the laying surface and to all of the lower transition surface $20_{14-12}$ of the basic tuckstone.

As a preference, the insulated surface is continuous, namely in one single piece.

The insulating layer may be held on the insulated surface by any known means of the prior art.

As a preference, the insulating layer is rigidly attached to the basic tuckstone, namely it forms a monolithic whole therewith, making it easier to handle during manufacture of the furnace. The insulating layer is preferably bonded to the insulated surface, as in FIG. 2a.

As a preference, the adhesive used to attach the insulating layer to the insulated surface is selected from among mixtures of ceramic powders and binders, preferably applied in liquid form.

As a preference, the powders are powdered alumina and/or silica and/or mullite. As a preference, the binders are selected from among colloidal silica, sodium silicate, organic resins, organic adhesives and mixtures thereof. The adhesive used may also be a commercially available adhesive such as the Fixwool FX adhesives from the company Unifrax.

In one embodiment, the insulated surface is locally structured to improve the attachment of the insulating layer 40. For example, one or more scorings, for example circular, closed on themselves, may be formed in order to create one or more attachment zones.

It may also be attached by means of fasteners, for example by means of a bracket housed in the recess defining the lower transition surface 2014-12 comprised between the laying surface 2014 and the interior edge 35 so as to sandwich the insulating layer with said surface.

As a preference, the insulating layer 40 exhibits a mean thickness, which is preferably constant, of less than 40 mm, preferably less than 32 mm, preferably less than 28 mm, preferably less than 22 mm, or even less than 18 mm or than 15 mm, or/or preferably greater than 3 mm, preferably greater than 5 mm, preferably greater than 10 mm.

As a preference, the insulating layer 40 exhibits enough rigidity to be self-supporting, namely to maintain its shape when it is handled at ambient temperature. As a preference, it has a shape that complements that of the insulated surface.

The insulating layer 40 preferably comprises ceramic fibers, in particular alumina and/or silica and/or zirconia and/or glass fibers, preferably leached glass fibers.

As a preference, the insulating layer comprises, preferably is made up of, a CMC.

Advantageously, the CMC has enough mechanical strength to withstand impacts, and enough rigidity to be handled easily and assembled with the basic tuckstone without deforming.

As a preference, the CMC comprises one or more of the following optional features:
- as a preference, the CMC is sintered;
- the CMC exhibits an open porosity, measured by the imbibition method, according to the principle of Archimedean thrust, greater than 25%, preferably greater than 30% and less than 45%, preferably less than 35%;
- more than 90%, preferably more than 95% of the mass, preferably more than 98% of the mass, preferably more than 99% of the mass, preferably more than 99.5% of the mass of the CMC consists of oxides;
- as a preference, the CMC comprises more than 30%, preferably more than 40%, preferably more than 50%, preferably more than 60% and/or less than 70% by volume of fibers;
- the fibers are made of an oxide material preferably comprising more than 50%, preferably more than 60%, or even more than 70%, or even more than 80%, or even more than 90% by mass of $Al_2O_3$ and/or $SiO_2$ and/or $ZrO_2$;
- the fibers are fibers selected from the fibers made up of more than 95%, preferably more than 98%, preferably more than 99%, preferably substantially 100% by mass of alumina, the fibers made up of more than 95%, preferably more than 98%, preferably more than 99%, preferably substantially 100% by mass of silica, preferably made up of more than 95%, preferably more than 98%, preferably more than 99%, preferably substantially 100% by mass of amorphous silica, the fibers made up of more than 95%, preferably more than 98%, preferably more than 99%, preferably substantially 100% by mass of mullite, the fibers made up of more than 95%, preferably more than 98%, preferably more than 99%, preferably substantially 100% by mass of glass, preferably leached glass,
- the fibers are preferably bundled in the form of filaments, a filament typically containing several hundred to several thousand fibers;
- the fibers, preferably the filaments, are preferably continuous and exhibit a length greater than 50 mm, or even greater than 100 mm.
- In one embodiment, the fibers, preferably the filaments, are arranged in the form of a woven fabric (having weft filaments and warp filaments) or of a mat (nonwoven). As a preference, the woven fabrics and/or the mats are arranged in the CMC in such a way as to extend substantially parallel to the insulated surface of the basic tuckstone;
- the matrix is made up of more than 90%, preferably more than 95%, preferably more than 99% oxides, as a percentage by mass; as a preference, the matrix is made up almost entirely of oxides;
- the matrix contains $Al_2O_3$ and/or $SiO_2$;
- as a preference, the matrix contains $Al_2O_3$ and $SiO_2$;
- as a preference, the $Al_2O_3$ content in the matrix, as a percentage by mass on the basis of the matrix, is greater than 65%, preferably greater than 70%;
- as a preference, the $SiO_2$ content in the matrix, as a percentage by mass on the basis of the matrix, is greater than 15%, preferably greater than 20% and/or less than 35%, preferably less than 30%;
- as a preference, the content of oxides other than $Al_2O_3$ and $SiO_2$ in the matrix, as a percentage by mass on the basis of the matrix, is less than 3%, preferably less than 2%, preferably less than 1%;
- as a preference, the $Al_2O_3$ content is greater than 60%, preferably greater than 65%;
- in one embodiment, the total content of $Al_2O_3$ and $SiO_2$ is greater than 80%, preferably greater than 85%, preferably greater than 90%, preferably greater than 95%, as a percentage by mass of the matrix on the basis of the oxides;
- in one embodiment, the silica in the matrix is amorphous;
- in one embodiment, the CMC exhibits the following chemical analysis, in percentage by mass on the basis of the oxides and for a total of 100%:
  $SiO_2$: 47%-67%,
  $Al_2O_3$: 32%-52%,
  oxide species other than $Al_2O_3$ and $SiO_2$: <5%, preferably <4%, preferably <3%, preferably <2%;
- the CMC has a thermal conductivity less than 1.3 $W·m^{-1}·K^{-1}$, preferably less than 1 $W·m^{-1}·K^{-1}$, preferably less than 0.9 $W·m^{-1}·K^{-1}$, preferably less than 0.8 $W·m^{-1}·K^{-1}$, preferably less than 0.7 $W·m^{-1}·K^{-1}$, preferably less than 0.6 $W·m^{-1}·K^{-1}$, preferably less than 0.5 $W·m^{-1}·K^{-1}$, between 20° C. and 500° C., preferably between 20° C. and 600° C.;
- the CMC has an apparent density greater than 1.4 $g/cm^3$, or even greater than 1.50 $g/cm^3$ and/or less than 2 $g/cm^3$, preferably less than 1.9 $g/cm^3$, preferably less than 1.80 $g/cm^3$.

In one embodiment, the insulating layer exhibits a sandwich structure comprising, in superposition, a first sheet, a filling material, and a second sheet. The first and second sheets may be attached to one another, preferably in such a way as to form a tube open at both ends, a sleeve open at one of its ends, or a sealed shell.

At least one, preferably each, of the first and second sheets is made of a CMC.

At least one, preferably each, of the first and second sheets exhibits a thickness greater than 2 mm, preferably greater than 3 mm, preferably greater than 5 mm.

The filling material preferably exhibits a thermal conductivity less than 2.0 $W·m^{-1}·K^{-1}$, preferably less than 1.8 $W·m^{-1}·K^{-1}$, preferably less than 1.5 $W·m^{-1}·K^{-1}$, preferably less than 1.3 $W·m^{-1}·K^{-1}$, preferably less than 1 $W·m^{-1}·K^{-1}$, preferably less than 0.9 $W·m^{-1}·K^{-1}$, preferably less than 0.8 $W·m^{-1}·K^{-1}$, preferably less than 0.7 $W·m^{-1}·K^{-1}$, preferably less than 0.6 $W·m^{-1}·K^{-1}$, preferably less than 0.5 $W·m^{-1}·K^{-1}$ between 20° C. and 500° C., preferably between 20° C. and 600° C., preferably between 20° C. and 700° C., preferably between 20° C. and 800° C., preferably between 20° C. and 900° C., preferably between 20° C. and 1000° C. As a preference, the filling material exhibits a thermal conductivity lower than that of the first and second sheets.

The filling material may be rigid or loose, for example in the form of hollow alumina beads, of a fiber wool, for example an alumina wool.

As a preference, the insulating layer 40 is configured in such a way as to exhibit a three-point bending yield strength, measured in accordance with standard ASTM C1341-13, greater than 3 MPa, preferably greater than 6 MPa, preferably greater than 10 MPa. Advantageously, the mechanical strength of the insulating layer, notably its impact strength, is thereby improved.

As a preference, and this is compulsory when the insulating layer 40 is arranged on at least part of the lower surface of the tank leg of the basic tuckstone (lower horizontal surface of the tank leg in the figures), the insulating layer is configured in such a way as to have a pyroscopic resistance greater than 400° C., preferably greater than 600° C., preferably greater than 800° C., preferably greater than 1000° C. Advantageously, the stability of the insulated tuckstone is thereby improved.

Figure 4:
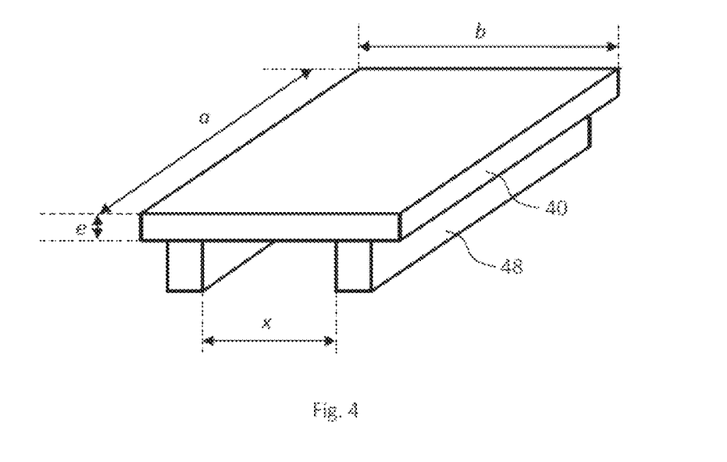
FIG. 4 schematically depicts the setup used for measuring the pyroscopic resistance of the insulating layer.

The pyroscopic resistance of an insulating layer of thickness e of an insulated tuckstone, to a temperature T, is determined using the following method: a test specimen of said insulating layer of length a equal to 500 mm, of width b equal to 400 mm and of thickness e is placed in an electric furnace, on bricks 48 made of RI34 of a thickness equal to 60 mm, according to the setup depicted in FIG. 4, the dimension x being equal to 250 mm. In this setup, one of the RI34 bricks is oriented, with respect to the insulating layer, like the metallic structure when the insulating tuckstone is in the service position.

The following thermal cycle is then performed:
the ambient temperature is increased up to the temperature T at a rate equal to 50° C./h,
the temperature T is maintained for 24 hours,
and then lowered to ambient temperature at a rate equal to 50° C./h.

After complete cooling, the deformation of the plate under its own weight, estimated by the mean of the deflections measured along each diagonal, is determined. The insulating layer is considered to exhibit a pyroscopic resistance in excess of the temperature T if the deformation of the sheet under its own weight is less than or equal to 5 mm.

In order to measure the compression strength of an insulating layer of thickness e of an insulated tuckstone, a test specimen of dimensions equal to 50×50×10 mm³ is taken from the insulating layer of this tuckstone, the thickness of 10 mm being in the direction of the thickness e.

A load is then applied to the entirety of the 50×50 mm² surface area of the test specimen, at ambient temperature, in the direction of the thickness, at a rate of displacement of 0.1 mm/min. This load is increased until the test specimen yields. The compression strength is equal to said load expressed in newtons, divided by the surface area over which said load is applied (in this instance 25 cm²).

As a preference, the insulating layer 40 is configured in such a way as to exhibit a compression strength, for example measured as described hereinabove, greater than 5 MPa, preferably greater than 10 MPa.

In order to measure the compressive crush strength of an insulating layer of thickness e, a test specimen of dimensions equal to 50×50×10 mm³ is extracted, the thickness of 10 mm being in the direction of the thickness e.

A load is then applied, at ambient temperature, to the entirety of the 50×50 mm² surface area of the test specimen, in the direction of the thickness, at a rate of displacement equal to 0.1 mm/min. The load is increased until the thickness of the test specimen is reduced by half (or in other words by 5 mm). The compressive crush strength is equal to the load obtained expressed in newtons divided by the surface area over which said load is applied (in this instance 25 cm²).

Conventionally, to insulate the tuckstone of the metallic structure, use is made of insulating layers consisting of mats of fibers ("insulating mats"). Unlike these layers, the insulating layer 40 preferably has a compressive crush strength, for example measured as described hereinabove, greater than 10 MPa, thereby improving the stability of the superstructure.

As a preference, the insulating layer 40 is configured in such a way as to exhibit a compressive crush strength, for example measured as described hereinabove, greater than 20 MPa, preferably greater than 30 MPa, preferably greater than 50 MPa, thereby improving the stability of the superstructure.

The insulating layer 40 thus exhibits a compressive crush strength greater than that of the insulating layers consisting of mats of fibers ("insulating mats") conventionally placed between the tuckstone and the metallic structure.

As a preference, the insulating layer 40 is configured in such a way as to exhibit high resistance to thermal shocks.

As a preference, the insulating layer 40 is configured in such a way as to exhibit high resistance to corrosion from soda-containing vapors. Advantageously, its service life in the glass furnace is thereby increased.

The use of a CMC, and in particular of the type of those described hereinabove, is particularly well suited to achieving these properties.

Manufacture

All the conventional methods for manufacturing tuckstones can be employed.

All the methods of manufacture enabling a CMC to be obtained can be employed.

The method of manufacture may in particular comprise the following steps:
impregnating a collection of woven fabrics or mats, preferably woven fabric or mats of filaments, with a slurry capable of forming a matrix after drying and/or sintering;
layering said woven fabrics and/or mats,
said layering being able to be produced by pressing, or vacuum forming.

The woven fabrics or the mats may be layered in such a way that the filaments of the various woven fabrics or mats substantially all exhibit the same direction, or different directions, for example at 45°, notably according to the mechanical properties desired. The layering can be done on a rigid support exhibiting the profile of the insulated surface of the tuckstone so as to obtain a CMC that has a profile close to that of said insulated surface.

When the insulating layer is rigid, its shape is preferably tailored to the insulated surface. This shape may be the result of the method used for manufacturing the insulating layer or may be obtained subsequently, for example by machining or by deformation.

In one embodiment, the basic tuckstone and/or the insulating layer are arranged in the service position while raw, namely before being sintered. The basic tuckstone is preferably in the form of a concrete. The sintering of the basic tuckstone and/or of the insulating layer is then performed in situ in the furnace.

Examples

Figure 5A:
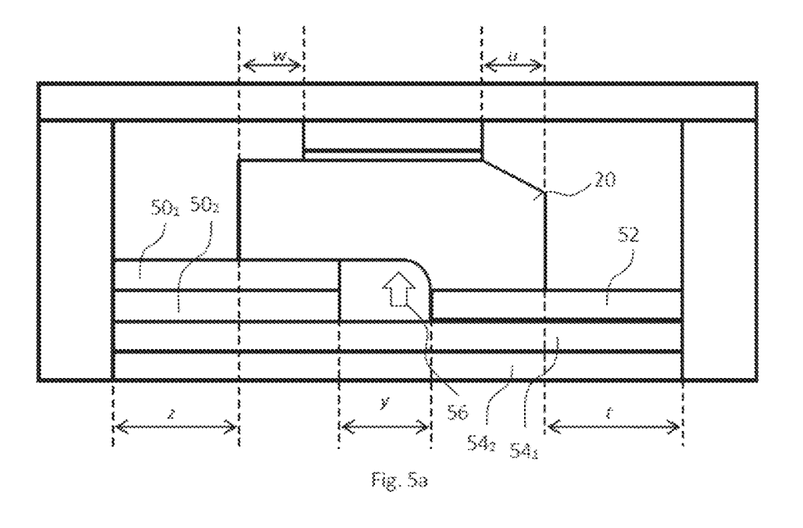
Figure 5B:
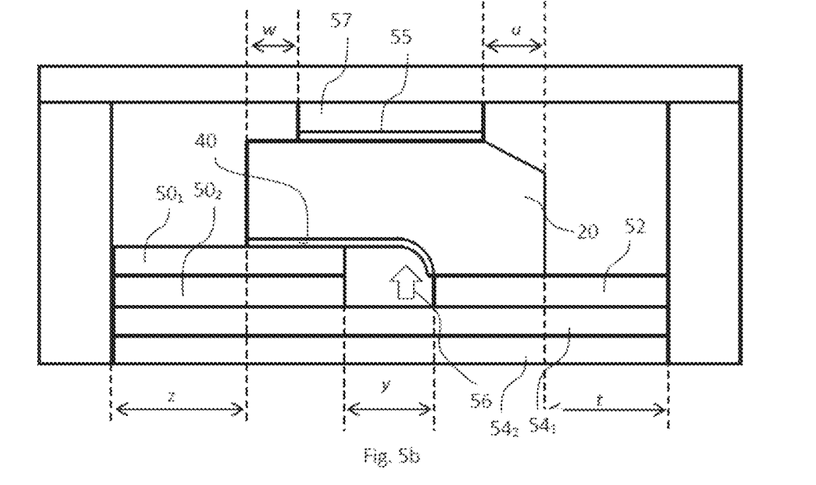
Figure 5C:
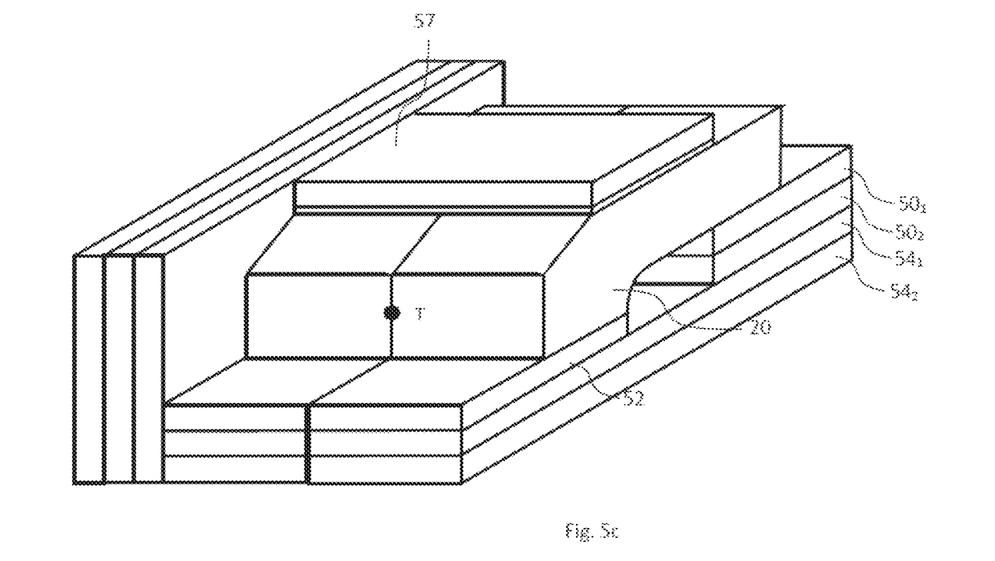
Figure 5D:
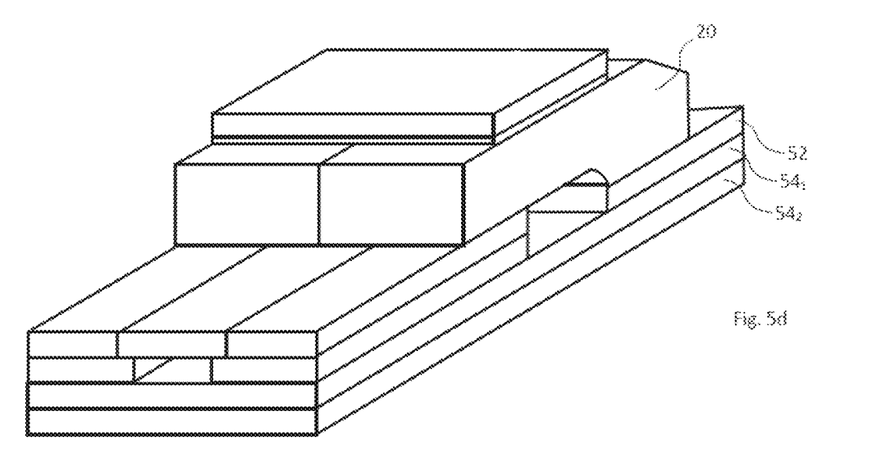

In order to reproduce the stress loadings undergone in service, basic tuckstones exhibiting the form of a profile section of L-shaped cross section, having a length $L_{20}$ equal to 270 mm, a width $l_{20}$ equal to 625 mm, a height $h_{20}$ equal to 230 mm and a thickness $e_{20}$ equal to 170 mm (FIG. 2a) are placed in a furnace in which the operating conditions are recreated, as shown in FIGS. 5a, 5b, 5c and 5d. FIG. 5a and FIG. 5b depict cross sections of a test setup for testing a tuckstone not according to the invention and one according to the invention, respectively, in a transverse midplane of said tuckstone. The dimensions t, u, w, y and z are equal to 440 mm, 160 mm, 160 mm, 330 mm and 500 mm, respectively. FIGS. 5c and 5d depict a perspective view of the setup for the tuckstones.

Intermittently, air at a pressure of 4 bar and at ambient temperature (20° C.) is blown onto the lower transition surface of the tuckstones, via an alumina duct of an internal diameter equal to 25 mm, closed at its end, and comprising a slot with a width of 4.5 mm and a length of 270 mm, allowing the air to escape in the direction indicated by the arrow 56 in FIGS. 5*a* and 5*b*.

The laying surface of each tuckstone rests on two rows 50$_1$ and 50$_2$ of RI34 bricks and its tank surface rests on a row 52 of RI34 bricks, the bricks exhibiting a thickness equal to 60 mm. The RI34 bricks 54$_1$ and 54$_2$ rest on two rows of RI30 bricks, each row having a thickness equal to 60 mm.

Only the end surfaces of the tuckstones are machined. The other surfaces are as cast and exhibit a skin microstructure. The end surfaces are thermally insulated by a vertical wall made of a layer of RI28 bricks and two layers of RI30 bricks (only one of the two walls is depicted in FIG. 5*c*), each layer of bricks having a thickness equal to 60 mm.

An Insulfrax® felt 55 exhibiting a thickness equal to 12 mm and marketed by the company Unifrax, followed by a row 57 of RI30 bricks exhibiting a thickness equal to 60 mm are laid on the superstructure surface of each basic tuckstone.

The RI28, RI30 and RI34 bricks are marketed by the company Saint-Gobain Performance Ceramics & Refractories.

The test is conducted on two basic tuckstones, made from one and the same material ER1195 marketed by the company Saint-Gobain SEFPRO, placed side by side, one of the basic tuckstones having no insulating layer and acting as reference, and one basic tuckstone being covered with an insulating layer, the insulated surface extending over the entirety of the laying surface and to all the lower transition surface, so as to constitute an insulated tuckstone. The insulating layer is made of an Insulfrax® felt exhibiting a constant thickness equal to 12 mm and a thermal conductivity between 20° C. and 1000° C. of less than 0.5 W·m$^{-1}$·K$^{-1}$, marketed by the company Unifrax. It is bonded in place using Fixwool® FX marketed by the company Unifrax.

A thermocouple T, the location of which is indicated in FIG. 5*c*, is used for regulating a gas burner so that the temperature on the side of the upper transition surface of the two tuckstones can be adjusted.

The test carried out is as follows, the temperature being regulated using the thermocouple T:
the temperature is increased from ambient to 1400° C. at a rate of 25° C./h, without air blowing,
the temperature is maintained at 1400° C. for 1 hour, without air blowing,
the temperature is maintained at 1400° C. for 6 hours with air blowing,
the temperature is maintained at 1400° C. for 6 hours without air blowing,
the 2 immediately preceding phases are repeated 5 times in succession,
the temperature is lowered to ambient at a rate of 25° C./h.

The damage to the tuckstones is evaluated by visual inspection. This inspection, performed before and after the test, makes it possible to reveal the presence of any cracks there might be.

The analysis and characterization of the microstructures of the products can be performed using an optical microscope of the Richert Polyvar 2 type, preferably using an ×5 magnification, coupled with image analysis software image J. The image analysis software allows independent crystals (i.e. crystals surrounded by a vitreous phase) to be isolated and their surface area determined. In particular, it is possible to distinguish crystals of free zirconia or of alumina-zirconia eutectic. Only the crystals the surface area of which is greater than 12 square microns are retained.

The number of crystals (Nc) per mm$^2$ surface area with skin microstructure (Nc-surface) and on a surface situated 4 cm within the test specimen (Nc-internal) is evaluated. The values given correspond to means over 4 sets of measurements. The ratio between Nc-surface and Nc-internal is calculated. A ratio higher than 4 is indicative of a skin microstructure.

Chemical analysis of the products is measured using "Inductively Coupled Plasma" or ICP, after the material that is to be analyzed has been calcined at 1000° C. for one hour, for elements the quantity of which does not exceed 0.5% and for boron and lithium. In order to determine the content of the other elements, a bead of the material that is to be analyzed is manufactured by melting the material, then chemical analysis is performed using X-ray fluorescence.

The thermal conductivity of the insulating layer is conventionally given by the product of the thermal diffusivity, of the apparent density and of the mass-specific heat capacity.

The diffusivity of the insulating layer is measured using the flash method using a halogen lamp with a power of 1000 W.

The apparent density is determined by weighing a known apparent volume of insulating layer, the apparent density being the ratio of the result of said weighing and of said apparent volume.

The mass-specific heat capacity is measured by differential scanning calorimetry (or DSC).

The test conducted shows that the reference tuckstone exhibits, after testing, two cracks, located on the lower transition surface and on the tank surface, and exhibiting a length greater than 100 mm and an opening of between 0.5 and 1 mm. The insulated tuckstone according to the invention exhibits no crack.

A second test is performed on two basic tuckstones, made from one and the same material ER1681 marketed by the company Saint-Gobain SEFPRO, positioned side by side.

The first of the basic tuckstones has no insulating layer and acts as reference.

The second of the basic tuckstones is covered with an insulating layer, the insulated surface extending over the entire laying surface and the entire lower transition surface, so as to constitute an insulated tuckstone according to the invention.

The insulating layer is made up of a ceramic matrix composite (CMC) exhibiting a constant thickness equal to 13 mm, a thermal conductivity between 20° C. and 500° C. of less than 0.6 W·m$^{-1}$·K$^{-1}$. This CMC is made up, for 44% of the mass thereof, of woven fabrics made of leached glass fibers having a silica content greater than 90% by mass, and of an alumina and silica matrix for the complement. It exhibits an open porosity equal to 38%, an apparent density equal to 1.65 g/cm$^3$, an Al$_2$O$_3$ content equal to 42%, an SiO$_2$ content equal to 57%, and a content of other oxides equal to 1%, the Al$_2$O$_3$, SiO$_2$ and other oxides contents being expressed as percentages by mass on the basis of the oxides of said ceramic matrix composite.

Figure 6A:
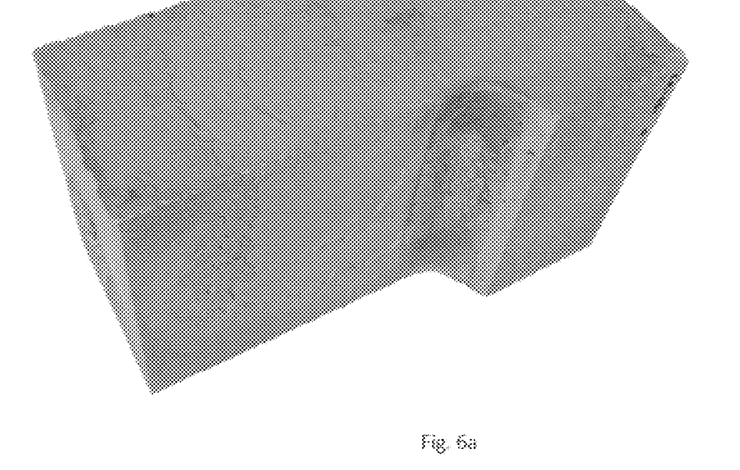
Figure 6B:
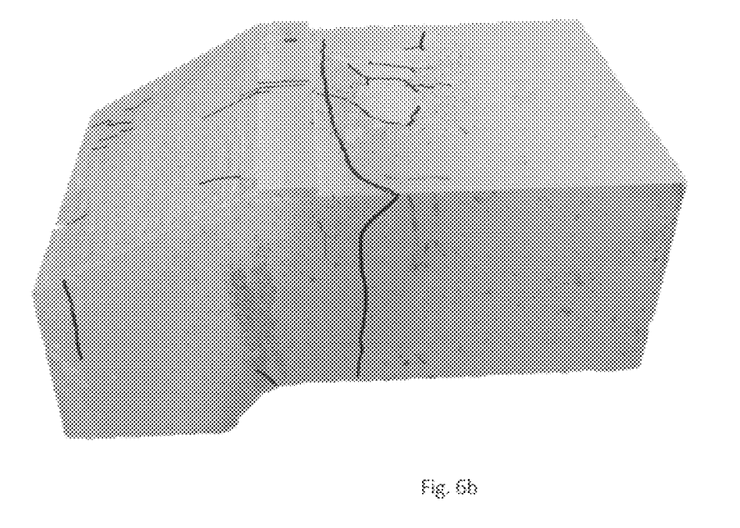

After testing, the insulated tuckstone according to the invention (FIG. 6*a*) exhibits substantially no cracks whereas the reference tuckstone (FIG. 6*b*) is riddled with cracks, identified with a black marker to make them more visible in the figure.

As is now clearly apparent, the invention makes it possible to improve the resistance to cracking and thus increases the lifespan of the furnace.

Of course, the invention is not restricted by the examples, which are given by way of illustration only. It also goes without saying that the embodiments described are merely examples and that they could be modified, notably by substituting technical equivalents, without thereby departing from the scope of the invention.

The invention claimed is:

1. A glass furnace comprising:
   a tank comprising an upper edge;
   a metallic structure; and
   a superstructure comprising a lateral wall and an intermediate course comprising an insulated tuckstone,
   said insulated tuckstone comprising:
     a cast or sintered basic tuckstone, in the form of a profile section of L-shaped cross section comprising a superstructure leg and a tank leg, said basic tuckstone defining an exterior surface made up:
       of first and second end surfaces delimiting the length of the basic tuckstone,
       of a lower surface constituted by a flat horizontal laying surface resting on the metallic structure, a tank surface extending facing the upper edge of the tank, and a lower transition surface connecting the laying surface and the tank surface;
       of an exterior lateral surface;
       of an upper surface comprising a superstructure surface on which the lateral wall is resting, and an upper transition surface connecting the superstructure surface and the lower surface;
     an insulating layer comprising a ceramic matrix composite made up of fibers rigidly bound together by a ceramic matrix, the insulating layer exhibiting a thermal conductivity lower than 2.0 $W \cdot m^{-1} \cdot K^{-1}$ between 20® C. and 500° C., Pa, the basic tuckstone having an insulated surface covered by said insulating layer, the insulating layer having a shape tailored to the insulated surface,
     said insulated surface being included in the lower surface of said basic tuckstone, extending into the lower transition surface, and representing more than 20% of the lower transition surface,
     said insulating layer having a chemical composition, as a percentage by mass on the basis of the oxides, such that $Al_2O_3+SiO_2+ZrO_2+CaO+Na_2O+MgO+K_2O+TiO_2+Fe_2O_3+HfO_2+P_2O_5+Y_2O_3 > 80\%$,
     wherein the insulated surface does not extend so far as to cover, even partially, the laying surface, or the insulated layer is pinched between the laying surface and the metallic structure.

2. The glass furnace as claimed in claim 1, wherein the lower transition surface includes a lower junction surface connecting said superstructure leg and tank leg, and the insulated surface extends in such a way as to cover at least said lower junction surface, the lower junction surface connecting a horizontal surface of the superstructure leg including the laying surface and a horizontal surface of the tank leg including the tank surface.

3. The glass furnace as claimed in claim 1, wherein the fibers are made of an oxide material comprising more than 50% $Al_2O_3$ and/or $SiO_2$ and/or $ZrO_2$, as a percentage by mass on the basis of the oxides, and/or wherein the fibers represent more than 30% and less than 70% of the volume of the ceramic matrix composite.

4. The glass furnace as claimed in claim 3, wherein the fibers are selected from among
   fibers made up, by mass, of more than 95% alumina,
   fibers made up, by mass, of more than 95% silica,
   fibers made up, by mass, of more than 95% mullite, and
   fibers made up, by mass, of more than 95% glass.

5. The glass furnace as claimed in claim 1, wherein the matrix contains $Al_2O_3$ and/or $SiO_2$.

6. The glass furnace as claimed in claim 1, wherein the matrix has an $Al_2O_3$ content greater than 65% and/or an $SiO_2$ content greater than 15% and less than 35%, and/or a content of oxides other than $Al_2O_3$ and $SiO_2$ of less than 3%, as percentages by mass on the basis of the matrix.

7. The glass furnace as claimed in claim 1, wherein the ceramic matrix composite exhibits the following chemical analysis, as percentages by mass on the basis of the oxides and for a total of 100%:
   $SiO_2$: 47%-67%,
   $Al_2O_3$: 32%-52%,
   oxide species other than $Al_2O_3$ and $SiO_2$: <5%.

8. The glass furnace as claimed in claim 1, wherein the insulating layer is attached to the insulated surface.

9. The glass furnace as claimed in claim 1, wherein the insulated surface extends at least as far as the laying surface and/or as far as the tank surface.

10. The glass furnace as claimed in claim 1, wherein the area of the insulated surface is more than 60% the area of the lower transition surface.

11. The glass furnace as claimed in claim 1, wherein the insulated surface extends at least to part of a horizontal portion of the lower transition surface defined by the superstructure leg.

12. The glass furnace as claimed in claim 1, wherein the insulated surface extends at least to part of the laying surface.

13. The glass furnace as claimed in claim 1, wherein the insulated surface extends as far as a horizontal portion of the lower transition surface defined by the tank leg, without covering said horizontal portion.

14. The glass furnace as claimed in claim 1, wherein the insulated surface extends at least to part of a horizontal portion of the lower transition surface defined by the tank leg.

15. The glass furnace as claimed in claim 1, wherein the insulating layer exhibits a thermal conductivity lower than 0.6 $W \cdot m^{-1} \cdot K^{-1}$ between 20° C. and 500° C.

16. The glass furnace as claimed in claim 1, wherein the insulating layer exhibits a sandwich structure comprising, in superposition, a first sheet of a ceramic matrix composite, a filling material exhibiting a thermal conductivity lower than 2.0 $W \cdot m^{-1} \cdot K^{-1}$ between 20® C. and 500° C., and a second sheet of a ceramic matrix composite.

17. A glass furnace comprising:
   a tank comprising an upper edge;
   a metallic structure; and
   a superstructure comprising a lateral wall and an intermediate course comprising an insulated tuckstone,
   said insulated tuckstone comprising:
   a cast or sintered basic tuckstone, in the form of a profile section of L-shaped cross section comprising a superstructure leg and a tank leg, said basic tuckstone defining an exterior surface made up:
     of first and second end surfaces delimiting the length of the basic tuckstone,
     of a lower surface constituted by a flat horizontal laying surface resting on the metallic structure, a tank surface extending facing the upper edge of the tank, and a lower transition surface connecting the laying surface and the tank surface;

of an exterior lateral surface;

of an upper surface comprising a superstructure surface on which the lateral wall is resting, and an upper transition surface connecting the superstructure surface and the lower surface;

an insulating layer comprising a sheet made of a sintered ceramic matrix composite made up of fibers rigidly bound together by a ceramic matrix, the fibers being arranged in the form of a woven fabric and exhibiting a compression strength greater than 1 MPa and a compressive crush strength greater than 10 MPa, the insulating layer exhibiting a thermal conductivity lower than 2.0 $W \cdot m^{-1} \cdot K^{-1}$ between 20° C. and 500° C., Pa, the basic tuckstone having an insulated surface covered by said insulating layer, the insulating layer having a shape tailored to the insulated surface, said insulated surface being included in the lower surface of said basic tuckstone, extending into the lower transition surface, and representing more than 20% of the lower transition surface, said insulating layer having a chemical composition, as a percentage by mass on the basis of the oxides, such that $Al_2O_3+SiO_2+ZrO_2+CaO+Na_2O+MgO+K_2O+TiO_2+Fe_2O_3+HfO_2+P_2O_3+Y_2O_3 > 80\%$, wherein the insulated surface does not extend so far as to cover, even partially, the laying surface, or the insulated layer is pinched between the laying surface and the metallic structure.

\* \* \* \* \*